United States Patent
Watanabe

(10) Patent No.: US 6,285,755 B1
(45) Date of Patent: Sep. 4, 2001

(54) TRANSMISSION SYSTEM AND TRANSMISSION APPARATUS

(75) Inventor: Kimio Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/159,378

(22) Filed: Sep. 23, 1998

(30) Foreign Application Priority Data

Mar. 17, 1998 (JP) .................................................. 10-066900

(51) Int. Cl.$^7$ ...................................................... H04M 1/76
(52) U.S. Cl. ........................... 379/417; 379/28; 379/399; 379/406; 379/416
(58) Field of Search ..................................... 370/420, 421; 379/26, 28, 399, 406, 416, 417

(56) References Cited

U.S. PATENT DOCUMENTS

| | | | |
|---|---|---|---|
| 3,655,920 | * 4/1972 | Laane | 379/292 |
| 4,057,961 | * 11/1977 | Goto et al. | 379/292 |
| 5,548,222 | * 8/1996 | Jensen et al. | 324/628 |

* cited by examiner

Primary Examiner—Ahmad Matar
Assistant Examiner—Bing Bui
(74) Attorney, Agent, or Firm—Helfgott & Karas, P.C.

(57) ABSTRACT

A transmission system comprises a plurality of transmission apparatuses which use a single channel commonly. Each transmission apparatus comprises switches for connecting and disconnecting transmission paths with adjacent transmission apparatuses, a line signaling-signal monitoring and detecting portion, and a network dividing logic portion which opens and closes the switches based on an output of the line signaling-signal monitoring and detecting portion. The network dividing logic portion closes switches of transmission paths between transmission apparatuses which perform a telephone conversation and opens the other switches.

7 Claims, 19 Drawing Sheets

FIG. 8

| STATES OF LINES | TYPES OF VECTORS |
|---|---|
| CALL DETECTION SIGNAL IS DETECTED IN LINE 'b' AFTER CALLING SIGNAL IS DETECTED IN LINE 'a', OR CALL DETECTION SIGNAL IS DETECTED IN LINE 'a' AFTER CALLING SIGNAL IS DETECTED IN LINE 'b' | REVERSE-DIRECTION VECTORS |
| CALL DETECTION SIGNAL IS DETECTED IN LINE 'a' AFTER CALLING SIGNAL IS DETECTED IN LINE 'a', OR CALL DETECTION SIGNAL IS DETECTED IN LINE 'b' AFTER CALLING SIGNAL IS DETECTED IN LINE 'b' | SAME-DIRECTION VECTORS |

FIG. 9

| SWITCH CONTROL CONDITIONS FOR EACH TRANSMISSION APPARATUS | NOTE |
|---|---|
| WHEN REVERSE-DIRECTION VECTORS ARE PRESENT IN AT LEAST ONE PORT OF PORTS OF THE SEPARATION AND COMBINING PORTION, SWITCHES FOR THE OTHER PORTS IN WHICH SAME-DIRECTION VECTORS ARE DETECTED ARE OPENED | HOWEVER, THESE CONTROL OPERATIONS ARE INEFFECTIVE FOR A TRANSMISSION APPARATUS WHICH IS ALREADY PERFORMING A TELEPHONE CONVERSATION |
| WHEN SAME-DIRECTION VECTORS ARE PRESENT IN EACH OF ALL PORTS OF THE SEPARATION AND COMBINING PORTION, ALL SWITCHES ARE LEFT CLOSED | |
| WHEN A FORCIBLE RELEASING CHARACTER IS INPUT, ALL SWITCHES ARE CLOSED | |

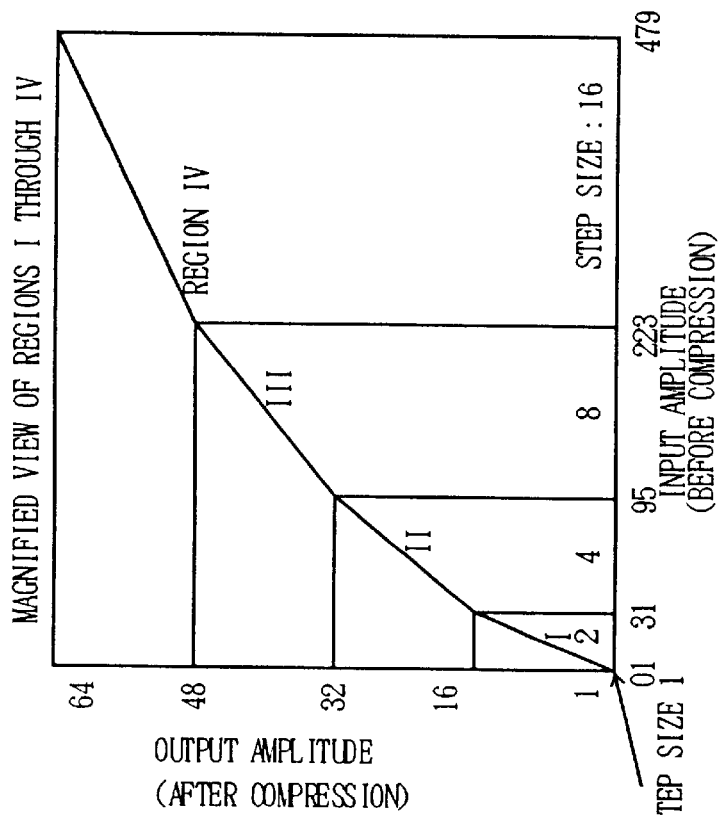
F I G. 16B
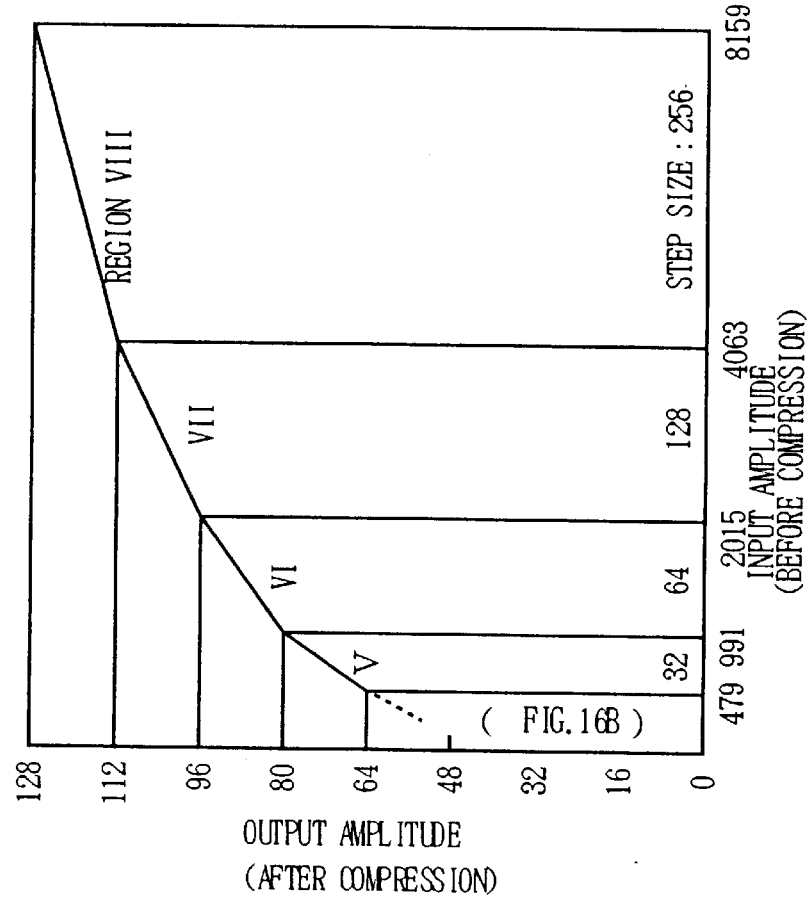
F I G. 16A

FIG. 17

| REGION | INPUT AMPLITUDE RANGE ANALOG LEVEL | STEP SIZE × QUANTIZATION INTERVAL VALUE | CODED OUTPUT REGION DETERMINATION BIT | CODED OUTPUT IN-REGION QUANTIZED BIT | CODED OUTPUT VALUE | CODED AMPLITUDE VALUE | |
|---|---|---|---|---|---|---|---|
|  | 0~1 | 1 × 1 | 000 | 0000 | 0 | 0 | |
| I | 1~3<br>3~5<br>⋮<br>29~31 | 2 × 15 | 000 | 0001<br>0010<br>⋮<br>1111 | 1<br>2<br>⋮<br>15 | 2<br>4<br>⋮<br>30 | CODE a1(00000010) |
| II | 31~35<br>35~39<br>39~43<br>⋮<br>91~95 | 4 × 16 | 001 | 0000<br>0001<br>0010<br>⋮<br>1111 | 16<br>17<br>18<br>⋮<br>31 | 33<br>37<br>41<br>⋮<br>92 | CODE b1(00010001)<br>CODE c1(00010010) |
| III | 95~103<br>103~111<br>⋮<br>215~223 | 8 × 16 | 010 | 0000<br>0001<br>⋮<br>1111 | 32<br>33<br>⋮<br>47 | 99<br>107<br>⋮<br>219 | |
| IV | 223~239<br>239~255<br>⋮<br>463~479 | 16 × 16 | 011 | 0000<br>0001<br>⋮<br>1111 | 48<br>49<br>⋮<br>63 | 231<br>247<br>⋮<br>471 | |
| V | 479~511<br>511~543<br>⋮<br>959~991 | 32 × 16 | 100 | 0000<br>0001<br>⋮<br>1111 | 64<br>65<br>⋮<br>79 | 495<br>527<br>⋮<br>975 | |
| VI | 991~1055<br>1055~1119<br>⋮<br>1951~2015 | 64 × 16 | 101 | 0000<br>0001<br>⋮<br>1111 | 80<br>81<br>⋮<br>95 | 1023<br>1087<br>⋮<br>1983 | |
| VII | 2015~2143<br>2143~2271<br>⋮<br>3935~4063 | 128 × 16 | 110 | 0000<br>0001<br>⋮<br>1111 | 96<br>97<br>⋮<br>111 | 2079<br>2207<br>⋮<br>3999 | |
| VIII | 4063~4319<br>4319~4575<br>⋮<br>7903~8159 | 256 × 16 | 111 | 0000<br>0001<br>⋮<br>1111 | 112<br>113<br>⋮<br>127 | 4191<br>4447<br>⋮<br>8031 | |

TRANSMISSION SYSTEM AND TRANSMISSION APPARATUS

BACKGROUND OF THE INVENTION

1. Field of the Invention

The present invention relates to a transmission system including a plurality of transmission apparatuses which use a single channel commonly, and to the transmission apparatuses used in the transmission system.

2. Description of the Related Art

Recently, in the field of data transmission, it is a trend that a single monitoring system integrally monitors different transmission systems such as PDH (Plesiochronous Digital Hierarchy), SDH (Synchronous Digital Hierarchy) and so forth. Thereby, a scale of the monitoring system becomes larger.

As shown in FIG. 1, respective transmission apparatuses 1 through 6 are connected therebetween by not only user information transmission lines 7 but also order-wire transmission lines (OW transmission lines or meeting transmission lines) 8 for transmitting a monitoring signal and for transmitting an order-wire signal, which is a telephone-conversation signal, between the transmission apparatuses. Recently, as the scale of an information transmission system becomes larger, the scale of a network of the order-wire transmission lines becomes larger.

FIG. 2 shows an example of an arrangement of the transmission apparatus B2, transmission apparatus C3, and transmission apparatus E5. In this example, the transmission apparatus C3 and transmission apparatus E5 are branched off from an analog separation and combining portion 13 of the transmission apparatus B2. A digital audio signal from the transmission apparatus A1 is transmitted through an optical/radio transmission path 20, is input to an optical/radio transmission portion 10 (for transmitting and receiving optical/radio signals) of the transmission apparatus B2, then, is demultiplexed from another signal(s) through a multiplexing/demultiplexing portion 11 (for multiplexing and demultiplexing signals), and is input to a two-wire telephone 16 via an order-wire transmission portion 19. Thereby, a voice from the transmission apparatus A1 can be heard in the transmission apparatus B2. An analog signal from the telephone 16 of the transmission apparatus B2 is transmitted to the transmission apparatus A1 through a route reverse to the above-mentioned route. That is, an audio signal output from the telephone 16 of the transmission apparatus B2 is transmitted to, via the order-wire transmission portion 19, the multiplexing/demultiplexing portion 11 which then multiplexes the audio signal with another signal (s), and, then, the thus-multiplexed signal is transmitted from the optical/radio transmission portion 10 through the optical/radio transmission path 20. Thus, the digital audio signal is transmitted to the transmission apparatus A1.

The order-wire transmission portion 19 includes a codec portion 12 which performs coding and decoding, an analog separation and combining portion 13 which performs separation and combining of analog signals, a 2W/4W converter 14 which performs conversion between a 2-wire signal and a 4-wire signal, and a terminal DTMF (Dual Tone Multi-Frequency) sending/detecting portion 15. The analog separation and combining portion 13 has a function such that each port outputs a signal of the sum of the signals input from all the other ports, and, a signal input through each port does not return to this port. The terminal DTMF sending/detecting portion 15 performs sending and detecting of a DTMF signal for signaling. In a case of calling, the terminal DTMF sending/detecting portion 15 sends a calling signal. In a case where a calling signal is received by this transmission apparatus, the terminal DTMF sending/detecting portion 15 sends a call detection signal to a terminal (transmission apparatus) which has sent the calling signal. Thereby, a telephone conversation is performed in the order-wire system by using a single channel, it is possible to select/change a transmission apparatus with which a telephone conversation will be performed, and it is possible that a telephone conversation is performed between arbitrary terminals (transmission apparatuses). In the example shown in FIG. 2, the terminal DTMF sending/detecting portion 15 is provided inside the order-wire transmission portion 19. However, it is also possible that the terminal DTMF sending/detecting portion 15 is provided outside the order-wire transmission portion 19.

Operation of the order-wire transmission portion 19 will now be described. In a case of signal reception, a received digital signal is converted into an analog signal through the codec portion 12, and is then combined through the analog separation and combining portion 13 with the signals transmitted from the transmission apparatuses C3 and E5 in an analog state. The thus-combined signal is input to the two-wire telephone 16 via the 2W/4W converter 14. In a case of signal transmission, an analog signal output by the telephone 16 is input to the analog separating and combining portion 13 via the 2W/4W converter 14. The analog separation and combining portion 13 combines the thus-input analog signal with signals from the transmission apparatuses C3 and E5 in the analog state. The combined signal is converted into a digital signal through the codec portion 12, and is input to the optical/radio transmission portion 20 in a digital signal form.

In the related art, the following influences occur when the scale of the network increases:

(1) Problem of Plurality of Telephone Conversations

There is only a single order-wire channel, and a frequency of using of the order-wire channel increases when the scale of the network increases. As a result, in many cases, multiple telephone conversations are performed through the single order-wire channel. Thereby, crosstalk occurs.

(2) Noise Generation Due to Analog Coupling between Transmission Apparatuses

FIG. 3 illustrates generation of noise due to analog coupling between transmission apparatuses in the related art. In this example, the transmission apparatuses 32 and 34 are branched off from an analog coupler 44 of the transmission apparatus 31. FIG. 3 shows a situation where noise is generated when a telephone conversation is performed from the transmission apparatus 30 to the transmission apparatus 33. An analog signal 'a' from the transmission apparatus 30 is transmitted via an analog-to-digital converter 40, a transmission path 35, a digital-to-analog converter 41, the analog coupler 44, an analog coupler 45, an analog-to-digital converter 42, a transmission path 37 and a digital-to-analog converter 43.

In this case, because a digital circuit does not connect (36) between the transmission apparatuses 31 and 32, the digital-to-analog converter 41 and the analog-to-digital converter 42 are needed. Further, through a transmission path between the analog couplers 44 and 45, noise α (external noise, internal noise of an electronic circuit and so forth) is picked up. This analog noise α is converted through the analog-to-digital converter 42. Accordingly, from the transmission apparatus 32, in addition to the signal received at the transmission apparatus 31, the noise α and quantization noise of the noise α are transmitted. As a result, the output of the digital-to-analog converter 43 includes, other than the signal 'a', quantization of the signal 'a', noise α, and quantization noise of the noise α. In FIG. 3, f(a) represents a digital signal obtained when the analog signal 'a' is quantized, and Nq(a) represents a quantization error generated at this time. Similarly, Nq(α) represents a quantization error generated when the noise α is quantized.

SUMMARY OF THE INVENTION

The present invention is directed to eliminating the above-described problems, and, an object of the present invention is to eliminate crosstalk and prevent noise generation due to analog coupling in a transmission system such as an order-wire transmission system.

A transmission system according to the present invention comprises a plurality of transmission apparatuses A through F which use a single channel commonly. Each transmission apparatus comprises switches 120 through 122 for connecting and disconnecting transmission paths connected with other transmission apparatuses, a line signaling-signal monitoring and detecting portion 100, and a network dividing logic portion 101 which opens and closes the switches based on an output of the line signaling-signal monitoring and detecting portion. The network dividing logic portion 101 closes switches for transmission paths between transmission apparatuses which perform a telephone conversation and opens the other switches.

In this arrangement, each transmission apparatus comprises switches 120 through 122 for connecting and disconnecting transmission paths connected with other transmission apparatuses, and the network dividing logic portion 101 closes switches for transmission paths between transmission apparatuses which perform a telephone conversation and opens the other switches. Thereby, it is possible to eliminate crosstalk in the commonly used order-wire channel.

The line signaling-signal monitoring and detecting portion 100 may monitor and detect, for each line, a calling signal and a call detection signal which responds to the calling signal. The network dividing logic portion 101 may determine, for each switch, whether the directions of the calling signal and the call detection signal flowing through the switch are the same or different, and closes the switch when the directions of the calling signal and the call detection signal flowing through the switch are different, and opens the switch when the directions of the calling signal and the call detection signal flowing through the switch are the same.

In this arrangement, the network dividing logic portion 101 determines, for each switch, whether the directions of the calling signal and the call detection signal flowing through the switch are the same or different, and closes the switch when the directions of the calling signal and the call detection signal flowing through the switch are different, and opens the switch when the directions of the calling signal and the call detection signal flowing through the switch are the same. Thereby, the network dividing logic portion appropriately controls the switches at the time of signaling before starting of a telephone conversation, and, thus, it is possible to start the telephone conversation in a condition where crosstalk does not occur.

A transmission apparatus according to the present invention uses a single channel commonly together with other transmission apparatuses. The transmission apparatus comprises switches 120 through 122 for connecting and disconnecting transmission paths connected with other transmission apparatuses, a line signaling-signal monitoring and detecting portion 100 which monitors and detects, for each line, a signaling signal transmitted between the transmission apparatus and another transmission apparatus, and a network dividing logic portion 101 which opens and closes the switches based on an output of the line signaling-signal monitoring and detecting portion. The network dividing logic portion 101 closes switches for transmission paths between transmission apparatuses which perform a telephone conversation and opens the other switches.

In this arrangement, each transmission apparatus comprises switches 120 through 122 for connecting and disconnecting transmission paths connected with other transmission apparatuses, and the network dividing logic portion 101 closes switches for transmission paths between transmission apparatuses which perform a telephone conversation and opens the other switches. Thereby, it is possible to eliminate crosstalk in the commonly used order-wire channel.

The line signaling-signal monitoring and detecting portion 100 may monitor and detect, for each line, a calling signal and a call detection signal which responds to the calling signal. The network dividing logic portion 101 may determine, for each switch, whether the directions of the calling signal and the call detection signal flowing through the switch are the same or different, and closes the switch when the directions of the calling signal and the call detection signal flowing through the switch are different, and opens the switch when the directions of the calling signal and the call detection signal flowing through the switch are the same.

In this arrangement, the network dividing logic portion 101 determines, for each switch, whether the directions of the calling signal and the call detection signal flowing through the switch are the same or different, and closes the switch when the directions of the calling signal and the call detection signal flowing through the switch are different, and opens the switch when the directions of the calling signal and the call detection signal flowing through the switch are the same. Thereby, the network dividing logic portion appropriately controls the switches at the time of signaling before starting of a telephone conversation, and thus, it is possible to start the telephone conversation in a condition where crosstalk does not occur.

When at least one switch has been closed, the network dividing logic portion 101 may not open the closed switch.

In this arrangement, when at least one switch has been closed, the network dividing logic portion 101 may not open the closed switch. Thereby, it is possible to prevent the call of a currently performed telephone conversation from being disconnected.

The network dividing logic portion 101 may close all or some opened switches as a result of receiving a forcible releasing signal from another transmission apparatus.

In this arrangement, the network dividing logic portion 101 closes all or some opened switches as a result of receiving a forcible releasing signal from another transmission apparatus or the like through which a third person intends to participate in a currently performed telephone conversation. Thus, the third person can participate in the currently performed telephone conversation.

The network dividing logic portions 101 open switches 64 and 65 for a connection between networks ordinarily, and close the switches when receiving an inter-network accessing signal.

In this arrangement, the network dividing logic portions 101 open switches 64 and 65 for connection between networks ordinarily, and close the switches when receiving an inter-network accessing signal. Thereby, many telephone conversations can be performed simultaneously as a result of telephone conversations being individually performed in respective networks, ordinarily. When it is necessary, the switches for connection between the networks are closed and a telephone conversation between the networks can be performed.

A transmission system according to another aspect of the present invention comprises a plurality of transmission apparatuses which use a single channel commonly. Each transmission apparatus comprises a digital separation and combining portion 213, wherein the digital separation and combining portion 213 separates and combines a digital audio signal of the transmission apparatus and a digital audio signal present on a transmission path connected with another transmission apparatus, in a digital state.

In this arrangement, the digital separation and combining portion 213 separates and combines the digital audio signal of the transmission apparatus and the digital audio signal present on a transmission path connected with another transmission apparatus, in the digital state. Thereby, occurrence of noises due to analog coupling can be prevented.

The digital separation and combining portion 213 may have a port for a transmission path for each order-wire signal which is separated from and combined with other order-wire signals, and the output signal of each port is the sum of the signals input through the other ports.

In this arrangement, the output signal of each port of the digital separation and combining portion 213 is the sum of the signals input through the other ports. Thus, the digital signals handled by the digital separation and combining portion 213 are limited to signals obtained from coding such that a summing low holds.

A transmission apparatus according to another aspect of the present invention uses a single channel together with other transmission apparatuses commonly. The transmission apparatus comprises a digital separation and combining portion 213, wherein the digital separation and combining portion 213 separates and combines a digital audio signal of the transmission apparatus and a digital audio signal present on a transmission path connected with another transmission apparatus, in a digital state, and the digital separation and combining portion 213 has a port for a transmission path for each order-wire signal which is separated from and combined with other order-wire signals, the output signal of each pert being the sum of the signals input through the other ports.

In this arrangement, the digital separation and combining portion 213 separates and combines the digital audio signal of the transmission apparatus and the digital audio signal present on the transmission path connected with another transmission apparatus, in the digital state. Thereby, occurrence of noises due to analog coupling can be prevented.

The digital audio signal may be obtained from coding of an analog signal such that digital values correspond to analog values in a manner of one-to-one correspondence.

In this arrangement, the digital audio signal may be obtained from coding of an analog signal, such as coding in accordance with an A-law or coding in accordance with a μ-law, such that digital values correspond to analog values in a manner of one-to-one correspondence.

An AD-PCM circuit may be provided between a transmission path and the digital separation and combining portion, the AD-PCM circuit performing code conversion between codes obtained from coding an analog signal such that digital values correspond to analog values in a manner of one-to-one correspondence and AD-PCM codes, and a signal of the AD-PCM codes is transmitted through the transmission path.

In this arrangement, because the signal of the AD-PCM codes is transmitted through the transmission path, it is possible to reduce the number of bits of the signal and to increase the transmission rate.

The transmission apparatus may further comprise switches 320 through 322 for connecting and disconnecting transmission paths connected with other transmission apparatuses, a line signaling-signal monitoring and detecting portion 330 which monitors and detects, for each line, a signaling signal transmitted between the transmission apparatus and another transmission apparatus, and a network dividing logic portion 301 which opens and closes the switches based on an output of the line signaling-signal monitoring and detecting portion, wherein the network dividing logic portion closes switches for transmission paths between transmission apparatuses which perform a telephone conversation and opens the other switches.

In this arrangement, the transmission apparatus includes switches 320 through 322 for connecting and disconnecting transmission paths connected with other transmission apparatuses, and the network dividing logic portion closes switches of transmission paths between transmission apparatuses which perform a telephone conversation and opens the other switches. Thereby, it is possible to eliminate crosstalk in the commonly used order-wire channel.

Other objects and further features of the present invention will become more apparent from the following detailed description when read in conjunction with the accompanying drawings.

BRIEF DESCRIPTIONS OF DRAWINGS

FIG. 8 illustrate states of lines and types of vectors;

FIG. 9 illustrates control logic of switches;

FIGS. 16A and 16B illustrate compression characteristics in accordance with a μ-law;

FIG. 17 shows conversion in accordance with the μ-law;

DETAILED DESCRIPTION OF THE PREFERRED EMBODIMENTS

Embodiments of the present invention will now be described with reference to figures.

(1) For the Invention Enabling a Plurality of Telephone Conversations

Figure 1:
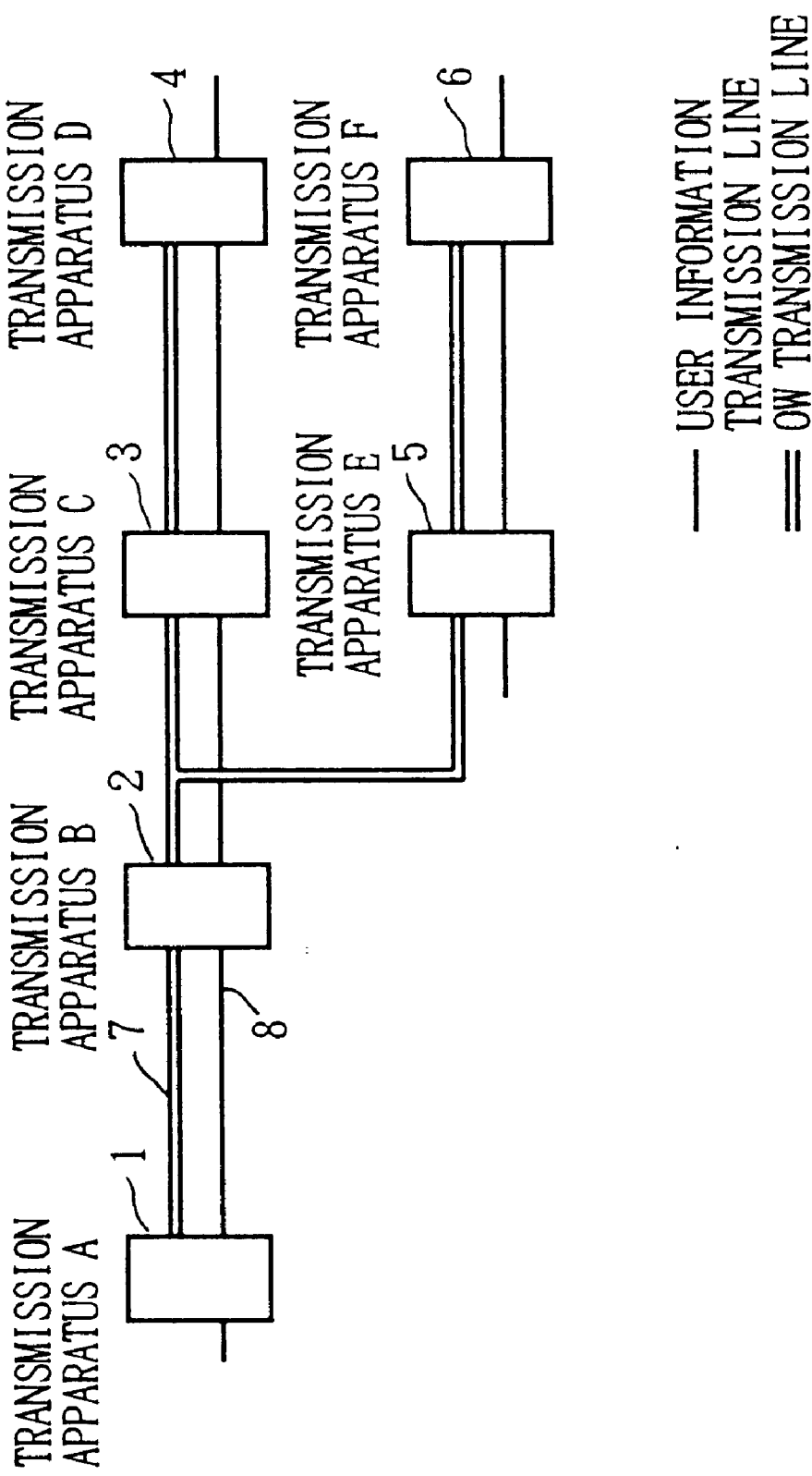
FIG. 1 illustrates an example of a network arrangement of transmission apparatuses.
Figure 4:
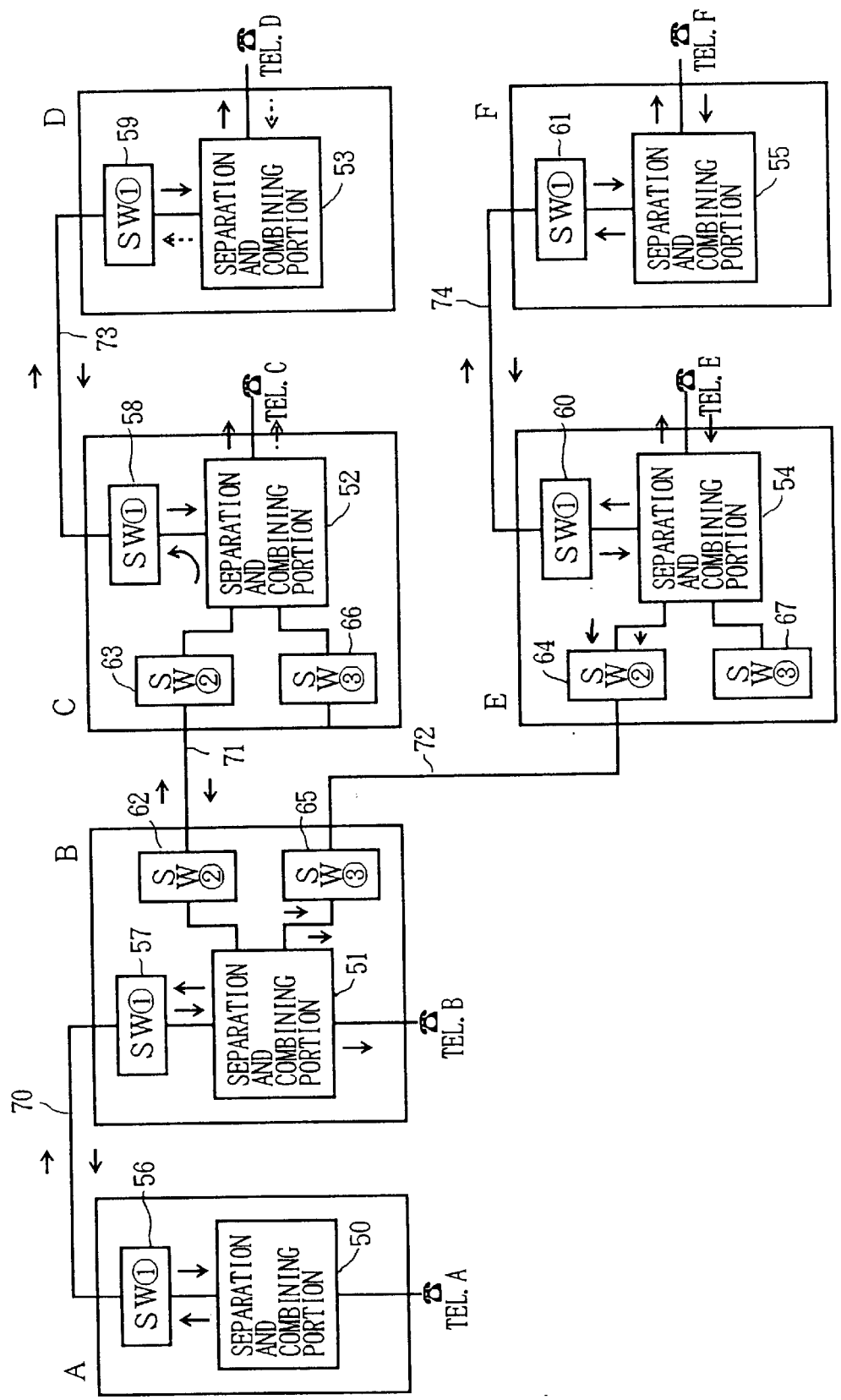
FIG. 4 illustrates a principle in which a plurality of telephone conversations can be performed simultaneously.

FIG. 4 illustrates a principle enabling a plurality of telephone conversations in a network the same as the network shown in FIG. 1. In the arrangement shown in FIG. 4, a telephone conversation between the transmission apparatuses A and D and a telephone conversation between the transmission apparatuses E and F can be performed without occurrence of crosstalk. For this purpose, in order to form a group of the transmission apparatuses A, B, C and D and a group of the transmission apparatus E and F, a transmission path 72 is disconnected.

In this arrangement, switches SW1 (58 through 61), switches SW2 (62–64) and switches SW3 (65 through 67) are provided. Each switch is opened and closed autonomously based on directions (vectors) of flows of signals flowing therethrough. For example, control is performed so that, when signals flow in different directions (hereinafter, referred to as 'reverse-direcion vectors') through a switch such as the switch 56, this switch is closed, and, when signals flow in the same direction (hereinafter, referred to as 'same-direcion vectors') through a switch such as the switch 64 or 65, this switch is opened.

When considering signal transmission between the transmission apparatuses A and D, because the vector of the 'calling signal' at the time of signaling is different from the vector of the 'call detection signal' for responding to the 'calling signal', and the signals flow in the reverse-direction vectors through the switches 56, 57, 62, 63, 58 and 59 between the transmission apparatuses A, B, C and D, each of these switches is closed. On the other hand, because signals flow through the switch 65 in the same-direction vectors, the switch 65 is opened. When considering signal transmission between the transmission apparatuses E and F, because the vector of the 'calling signal' at the time of signaling is different from the vector of the 'call detection signal' for responding to the 'calling signal', and the signals flow in the reverse-direction vectors through the switches 60 and 61 between the transmission apparatuses E and F, each of these switches is closed. On the other hand, because signals flow through the switch 64 in the same-direction vectors, the switch 64 is opened.

As a result, the group of the transmission apparatuses A, B, C and D and the group of the transmission apparatuses E and F are formed. Thereby, telephone conversations can be performed between the transmission apparatuses A and D and between the transmission apparatuses E and F individually without occurrence of crosstalk.

Figure 2:
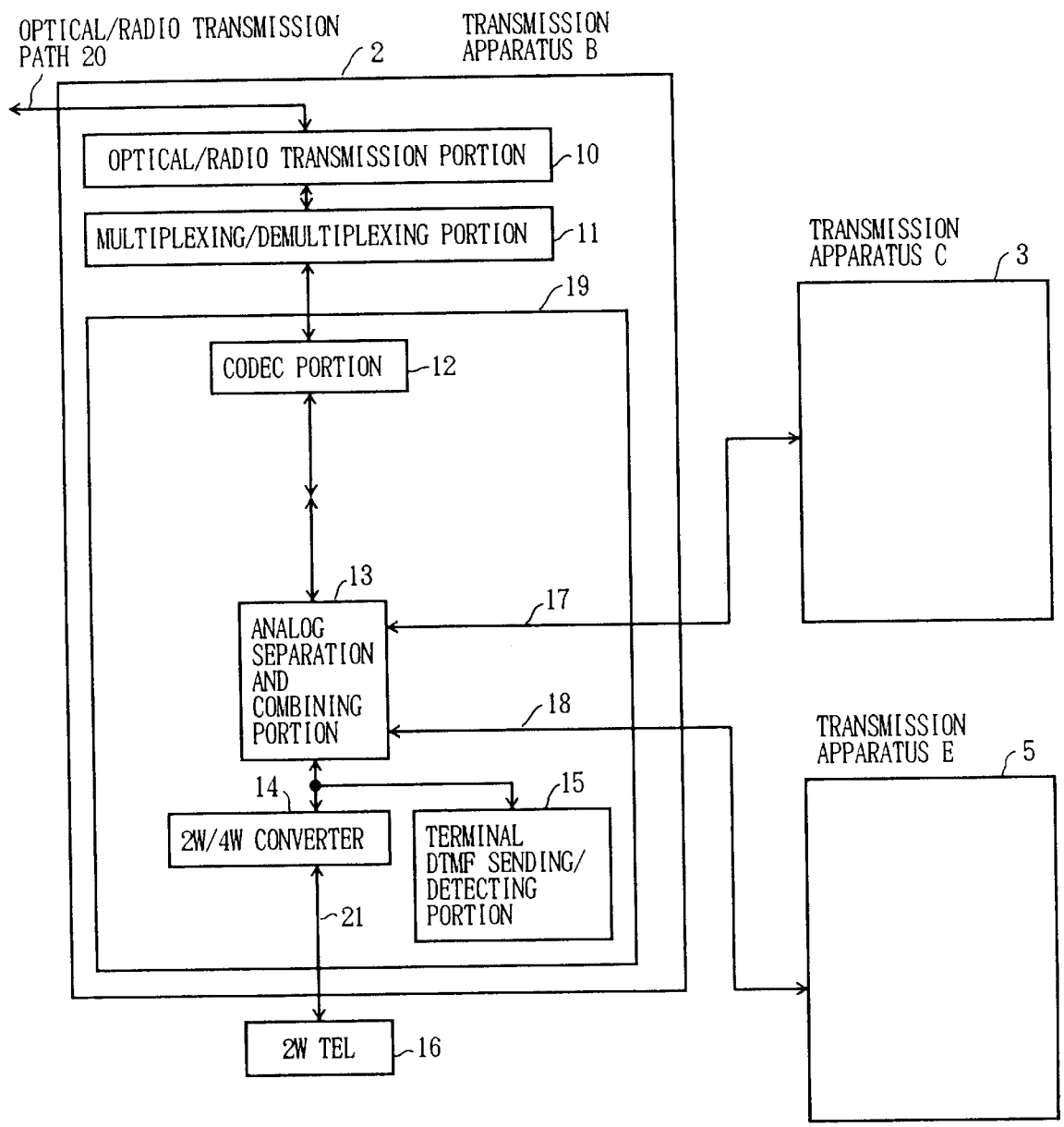
FIG. 2 illustrates an example of an arrangement of a transmission apparatus in the related art.
Figure 5:
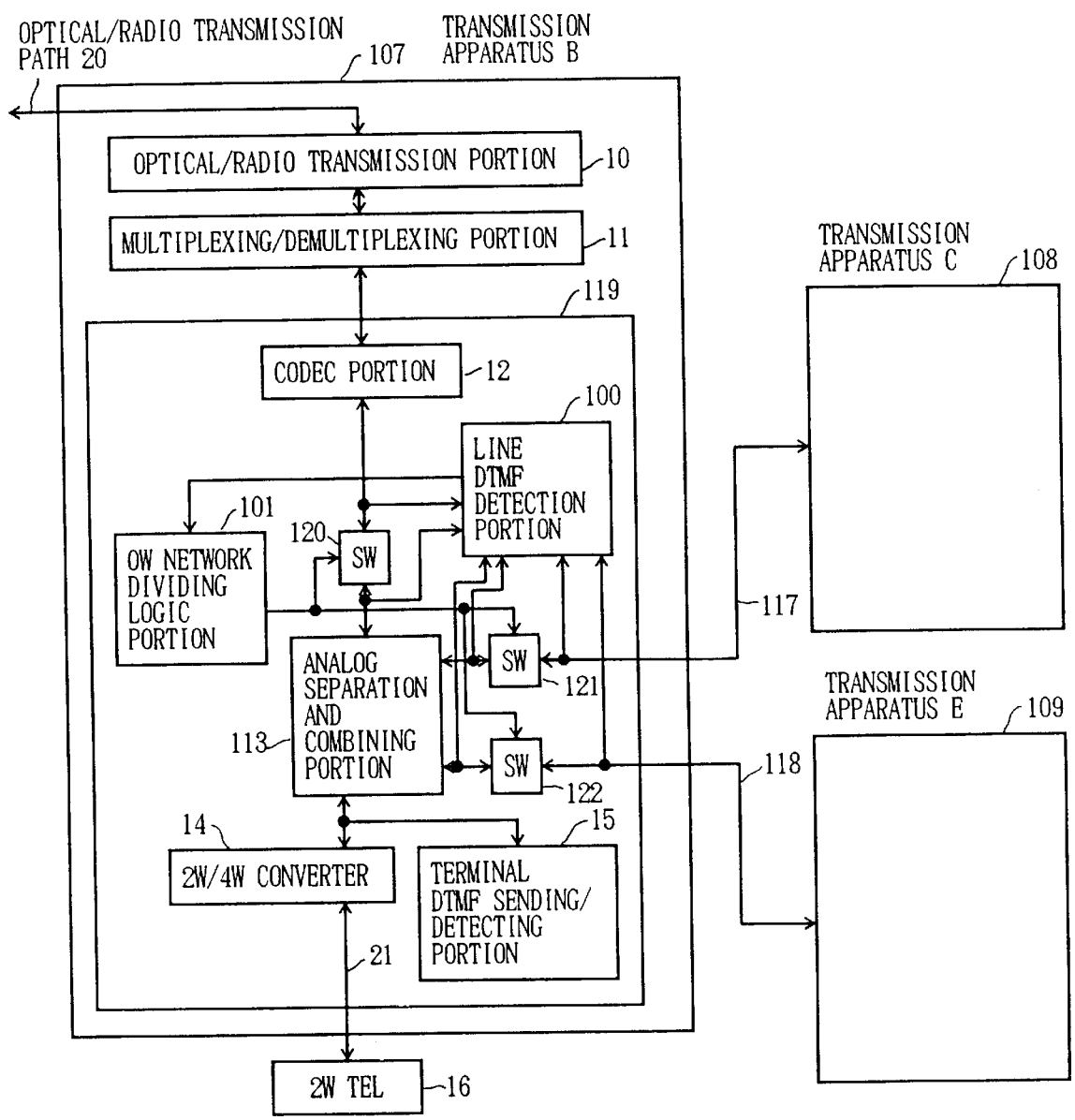
FIG. 5 shows an arrangement of a transmission apparatus in an embodiment of the present invention.

FIG. 5 shows an embodiment of the principle described above. The transmission apparatus B shown in FIG. 5 is different from the transmission apparatus B shown in FIG. 2 as follows: Switches 120, 121 and 122 are provided to an analog separation and combining portion 113 for a transmission path to be connected with each of other transmission apparatuses; and a line DTMF detection portion 100 which detects signals at the time of signaling, and an order-wire network dividing logic portion 101 are provided. The line DTMF detecting portion 100 detects for each line whether or not the calling signal and the call detection signal are present, and sends the result of the detection to the order-wire network dividing logic portion 101. The order-wire network dividing logic portion 101 understands the directions of flow of the calling signal and call detection signal, which flow through the transmission path connected with each of the other transmission apparatuses, as vectors, and determines whether the vectors are the reverse-direction vectors or the same-direction vectors. As a result, the order-wire network dividing logic portion 101 controls each switch so that, when the directions of flow of the calling signal and call detection signal flowing through the switch are the reverse-direction vectors, this switch is closed, and, when the directions of flow of the calling signal and call detection signal flowing through the switch are the same-direction vectors, this switch is opened. Although the terminal DTMF sending/detecting portion 15 sends and receives the signals for the signaling, the line DTMF detecting portion 100 itself is provided not for the signaling but for detecting the directions of the signaling signals. When the line DTMF detecting portion 100 detects whether or not the calling signal and call detection signal are present in each line, this detection is performed as a result of presence of the signals being detected either inside or outside of each switch. The inside of each switch means the side at which the analog separation and combining portion 113 is connected, while the outside of each switch means the side at which a respective one of the other transmission apparatuses A, C and E is connected.

Figure 6:
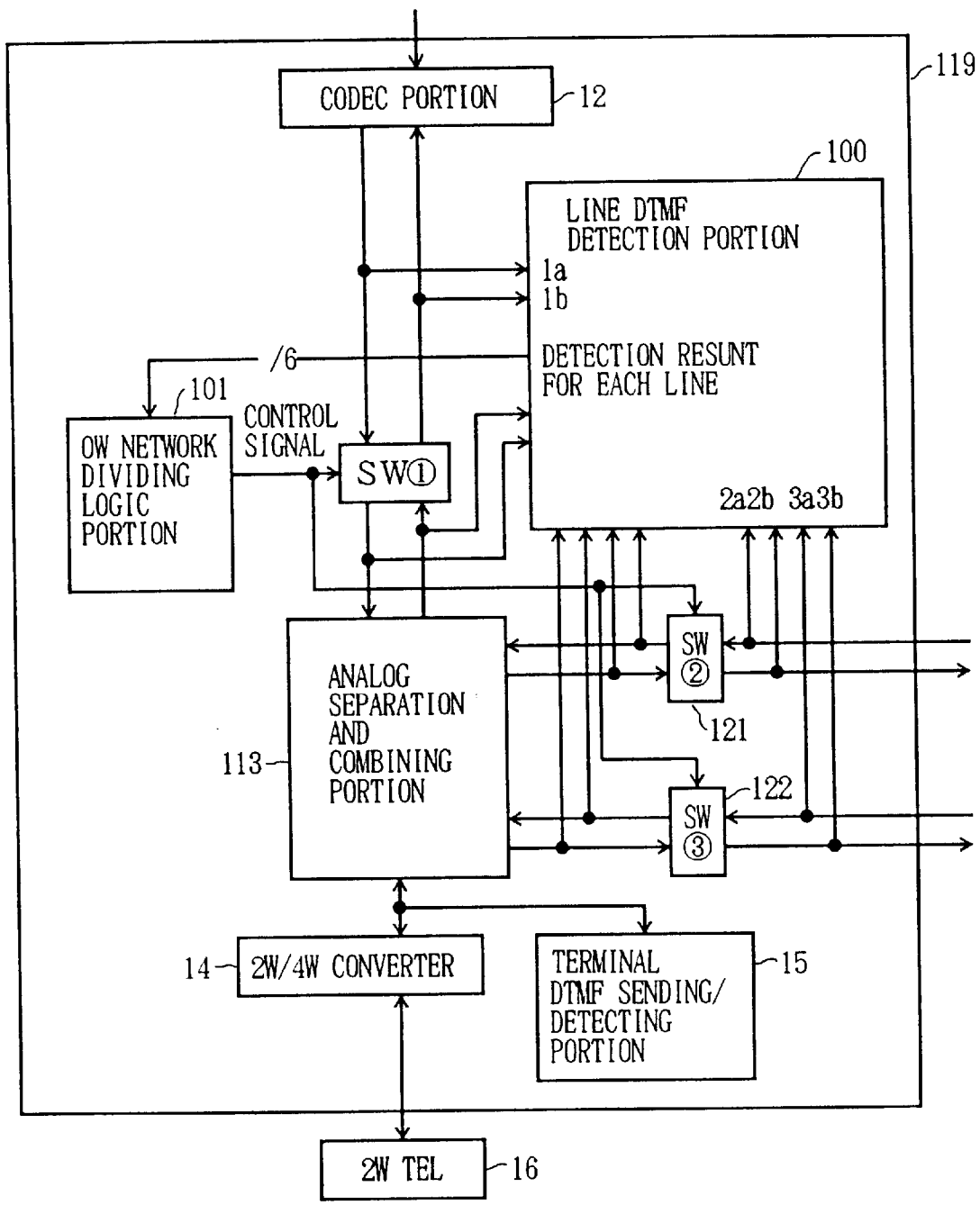
FIG. 6 illustrates an example of an order-wire transmission portion.

FIG. 6 shows an example of a detailed arrangement of an order-wire transmission portion 119. Each transmission apparatus which intends to perform a telephone conversation sends a DTMF signal (calling signal) for calling another transmission apparatus from the terminal DTMF sending and detecting portion 15 of the transmission apparatus which intends to perform the telephone conversation, before performing the telephone conversation. The other transmission apparatus which has received the calling signal sends the DTMF signal (call detection signal) to the transmission apparatus which intends to perform the telephone conversation. The terminal DTMF sending and detecting portion 15 of the transmission apparatus which intends to perform the telephone conversation receives the call detection signal, and performs the next step for performing the telephone conversation. These DTMF signals are detected by the line DTMF detecting portion 100 for each line (1a, 1b, 2a, 2b, 3a, 3b). The line DTMF detecting portion 100 sends the detection result to the order-wire network dividing logic portion 101 by six bits. For each line, the direction of the signal is determined as shown in the arrows in FIG. 6. Therefore, the order-wire network dividing logic portion 101 determined whether the reverse-direction vectors or the same-direction vectors are detected, based on the transmission path through which the signals flow and the contents ('calling signal' or 'call detection signal') of these signals. In the example shown in FIG. 6, the line DTMF detecting portion 100 performs the signal detection for each line (1a, 1b, 2a, 2b, 3a, 3b) at the outside of each switch. However, it is also possible that the line DTMF detecting portion 100 performs the signal detection for each line (1a, 1b, 2a, 2b, 3a, 3b) at the inside of each switch.

Figure 7:
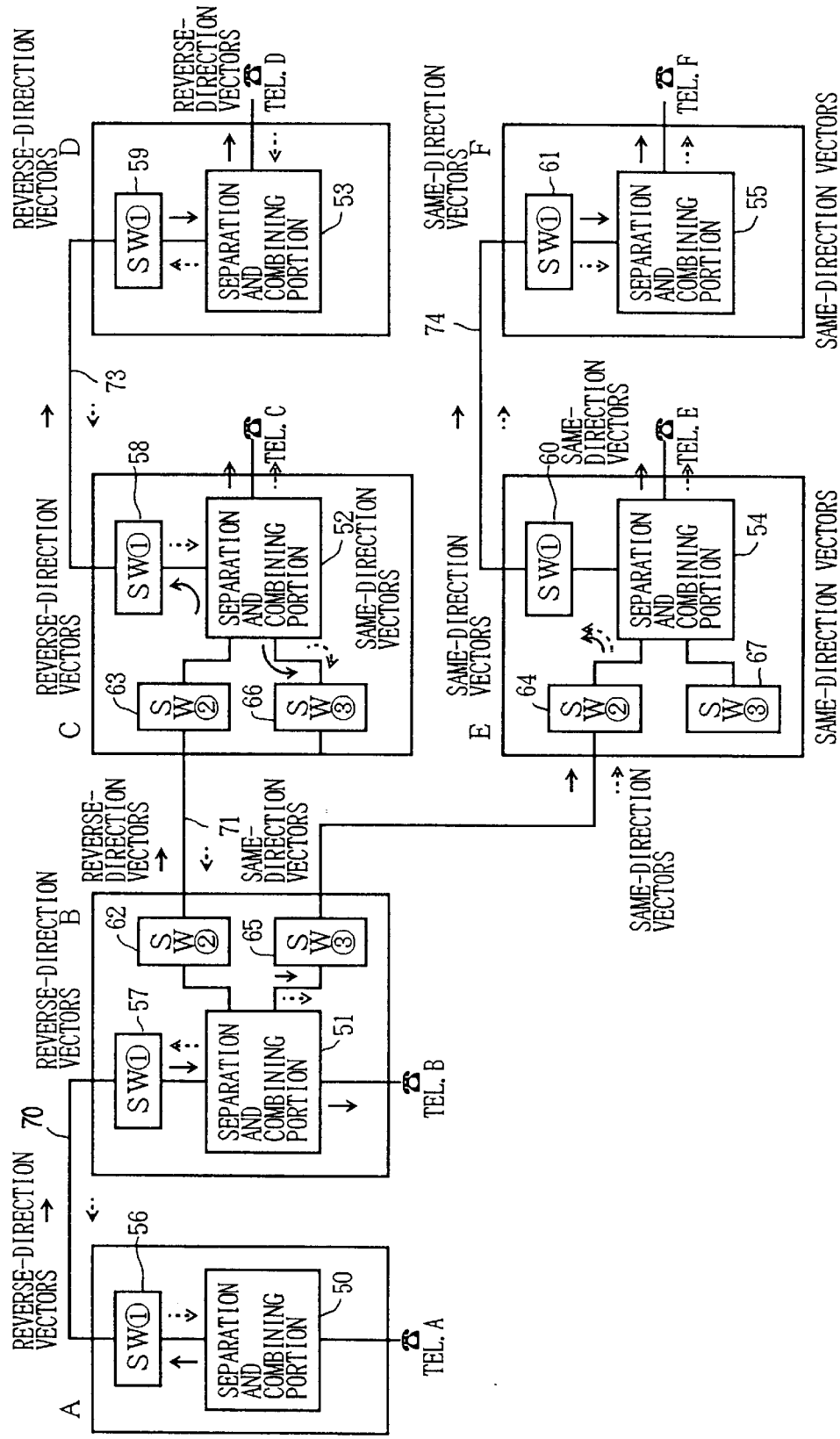
FIG. 7 illustrates an example of an arrangement of an order-wire network and switches.

FIG. 7 shows an example in which, in the arrangement shown in FIG. 4, the transmission apparatus A sends the calling signal to the transmission apparatus D, and, in response thereto, the transmission apparatus D sends the call detection signal to the transmission apparatus A. In FIG. 7, the arrows of a solid line represent the flow of the calling signal and the arrows of a broken line represent the flow of the call detection signal. When the directions of the arrows are the same direction, the calling signal and the call detection signal are the same-direction vectors. When the directions of the arrows are different directions, the calling signal and the call detection signal are the reverse-direction vectors.

The order-wire network dividing logic portion 101 controls the switches according to the following logic: when there is at least one transmission path of the transmission paths connected to the respective other transmission apparatuses in which the reverse-direction vectors are detected, the switch corresponding to this at least one transmission path is closed, and all the other switches are opened; and when the same-direction vectors are detected in all the transmission paths connected to the respective other transmission apparatuses, all the switches are closed.

With this control, when one telephone conversation is finished, all the switches are closed.

As a result of this logic, in FIG. 7, each of the switch 65 of the transmission apparatus B and the switch 66 of the transmission apparatus C is opened. As a result, a group of the transmission apparatuses A, B, C and D is formed and is separated from the transmission apparatuses E and F.

This operation includes the following steps:

1) The for-line DTMF detecting portion detects, for each line, the calling signal and the call detection signal.
2) The order-wire network dividing logic portion checks vectors in each transmission path of the transmission paths to be connected to the other respective transmission apparatuses.
3) Whether the calling signal and call detection signal are the same-direction vectors or the reverse-direction vectors is detected for each transmission path.
4) When the reverse-direction vectors are detected in a transmission path, the switch provided in the transmission path is closed, and when the same-direction vectors are detected in a transmission path, the switch provided in the transmission path is opened.

Thereby, the order-wire network is divided. With this control, because each transmission apparatus performs determination and control individually, appropriate division is performed autonomously in the entire network.

These switches can be closed at any time when a forcible releasing signal (character) is received from another signal circuit. It is possible that a third person can intrude himself or herself into an already-performed telephone conversation as a result of a specific switch being closed by the forcible releasing signal (character).

FIG. 8 shows line states and types of vectors. In FIG. 6, when the call detection signals are detected in the lines 1b, 2b, 3b after the calling signals are detected in the lines 1a, 2a, 3a, respectively, or when the call detection signals are detected in the lines 1a, 2a, 3a after the calling signals are detected in the lines 1b, 2b, 3b, respectively, it is determined that the reverse-direction vectors are detected. When the call detection signals are detected in the lines 1a, 2a, 3a after the calling signals are detected in the lines 1a, 2a, 3a, respectively, or when the call detection signals are detected in the lines 1b, 2b, 3b after the calling signals are detected in the lines 1b, 2b, 3b, respectively, it is determined that the same-direction vectors are detected.

FIG. 9 shows the vectors defined above and the control logic of the switches for each transmission apparatus. In this case, when the transmission apparatus is already performing a telephone conversation, the control conditions are ineffective. That is, when the transmission apparatus is already performing the telephone conversation, the order-wire network dividing logic portion is inhibited from performing a new switch control so as to prevent the call of the currently performed telephone conversation from being disconnected. However, even during a telephone conversation, when forcible release of network division is desired, it is possible to release the network division (to return to the original state) by sending the forcible releasing signal (character).

Figure 10:
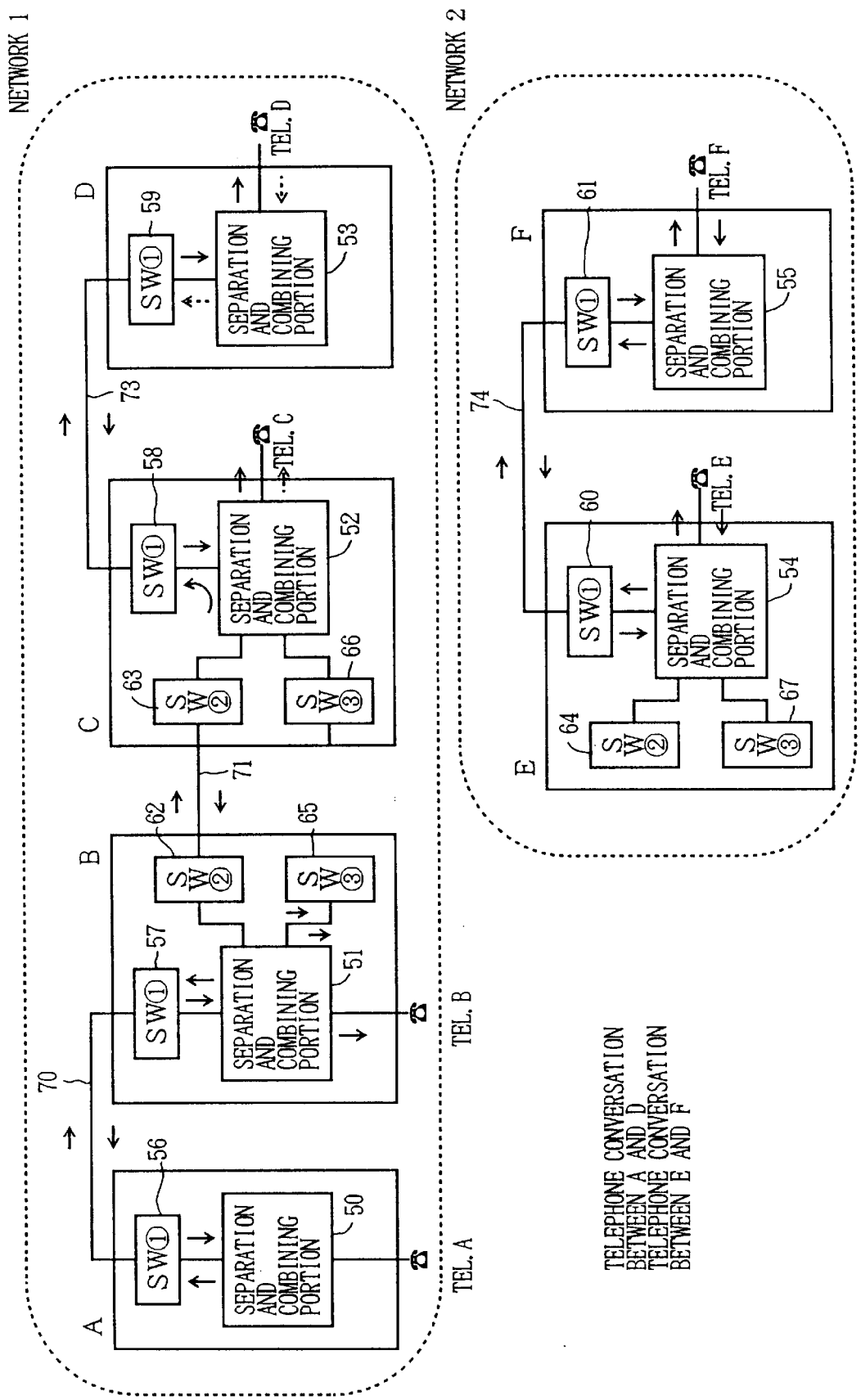
FIG. 10 illustrates operations of switches which act as gateways.

Further, with referenced to FIG. 10, the switch (switch 64) which acts as a gateway between respective networks (a network 1 and a network 2) is ordinarily opened (the gateway is ordinarily closed), and, if necessary, this switch is closed (the gateway is opened). For this purpose, it is possible, using an other-network accessing character, to control closing and opening of the specific switch. Further, by this control, the divided networks are used, ordinarily, so that many telephone conversations can be performed at the same time. When it is necessary, the switch is closed and, thus, it is possible to access another network.

As a result of this transmission system being used for maintaining and construction of the transmission apparatuses, rapid service can be provided to a user.

Figure 3:
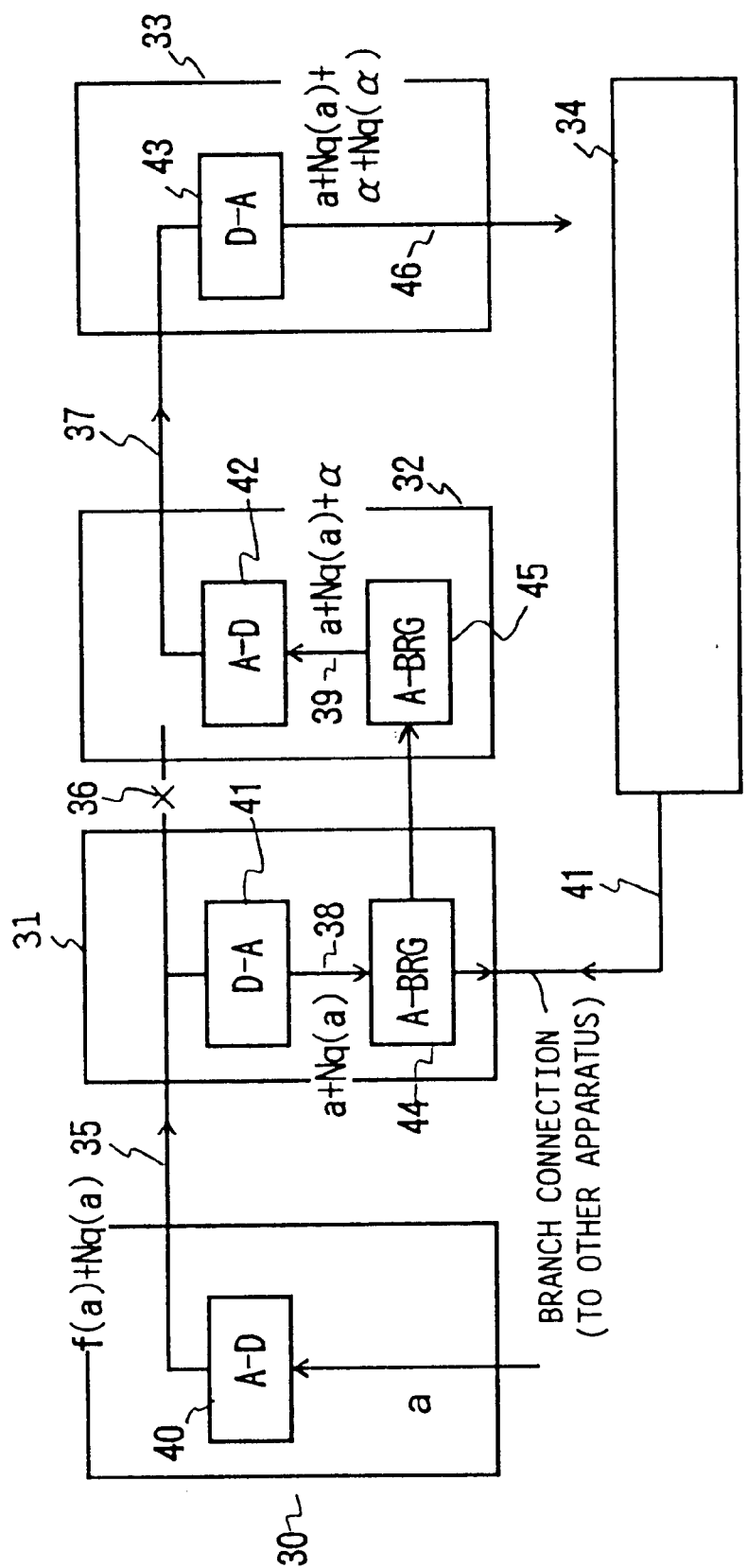
FIG. 3 illustrates generation of noises based on analog coupling.
Figure 11:
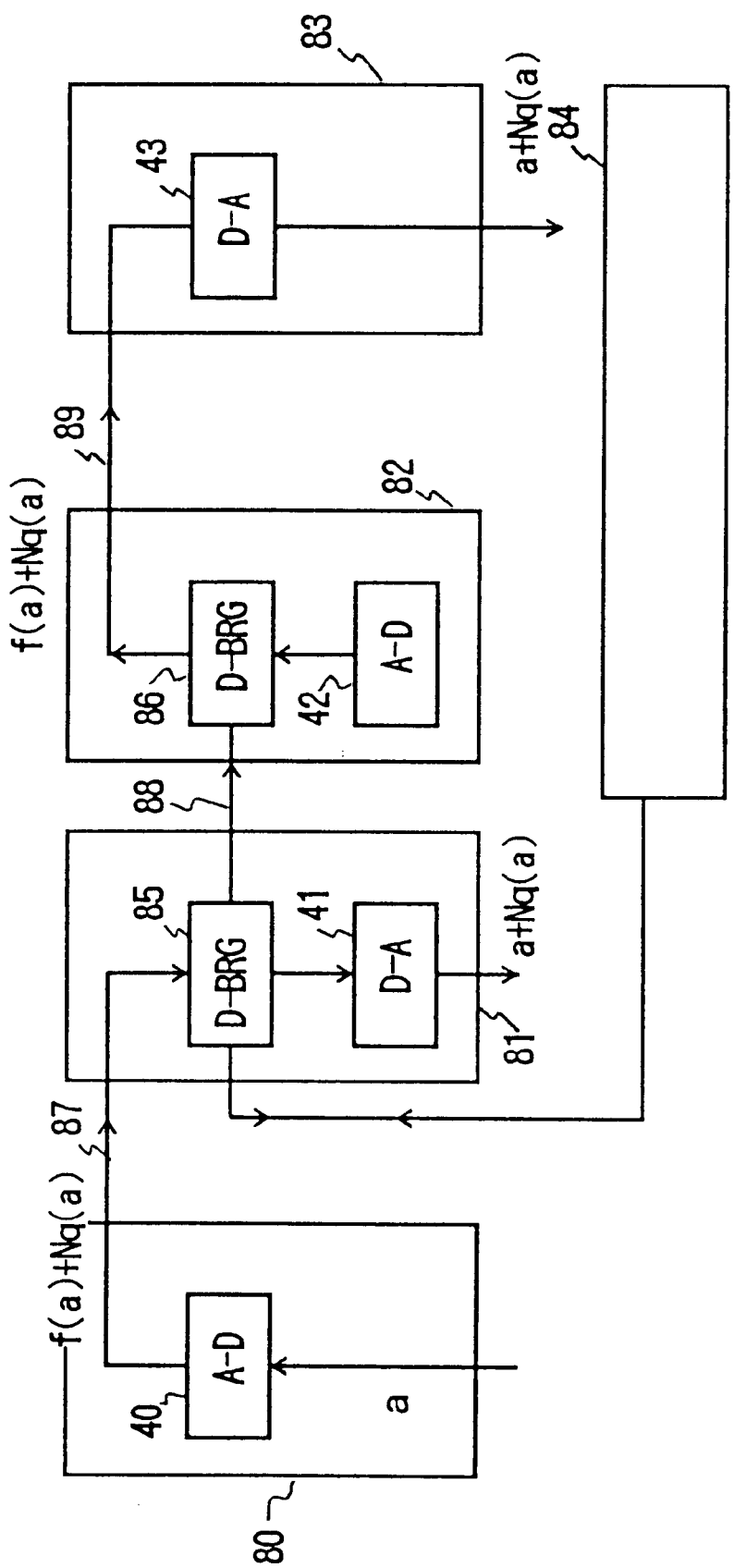
FIG. 11 illustrates a principle in which generation of noises due to analog coupling can be prevented.

(2) For the Invention for Preventing Noise Generation Based on Analog Coupling Between Transmission Apparatuses FIG. 11 illustrates a principle for preventing noise generation due to analog coupling between the transmission apparatuses. The arrangement of the network is the same as that shown in FIG. 3. The transmission apparatuses 81 and 82 include digital couplers 85 and 86, respectively, and are connected through a digital transmission path 88 with each other. As a result, noise generation occurring in analog transmission between the transmission apparatuses can be prevented, and, also, error generation due to digital-to-analog conversion and analog-to-digital conversion in the transmission apparatuses 81 and 82 can be prevented.

Figure 12:
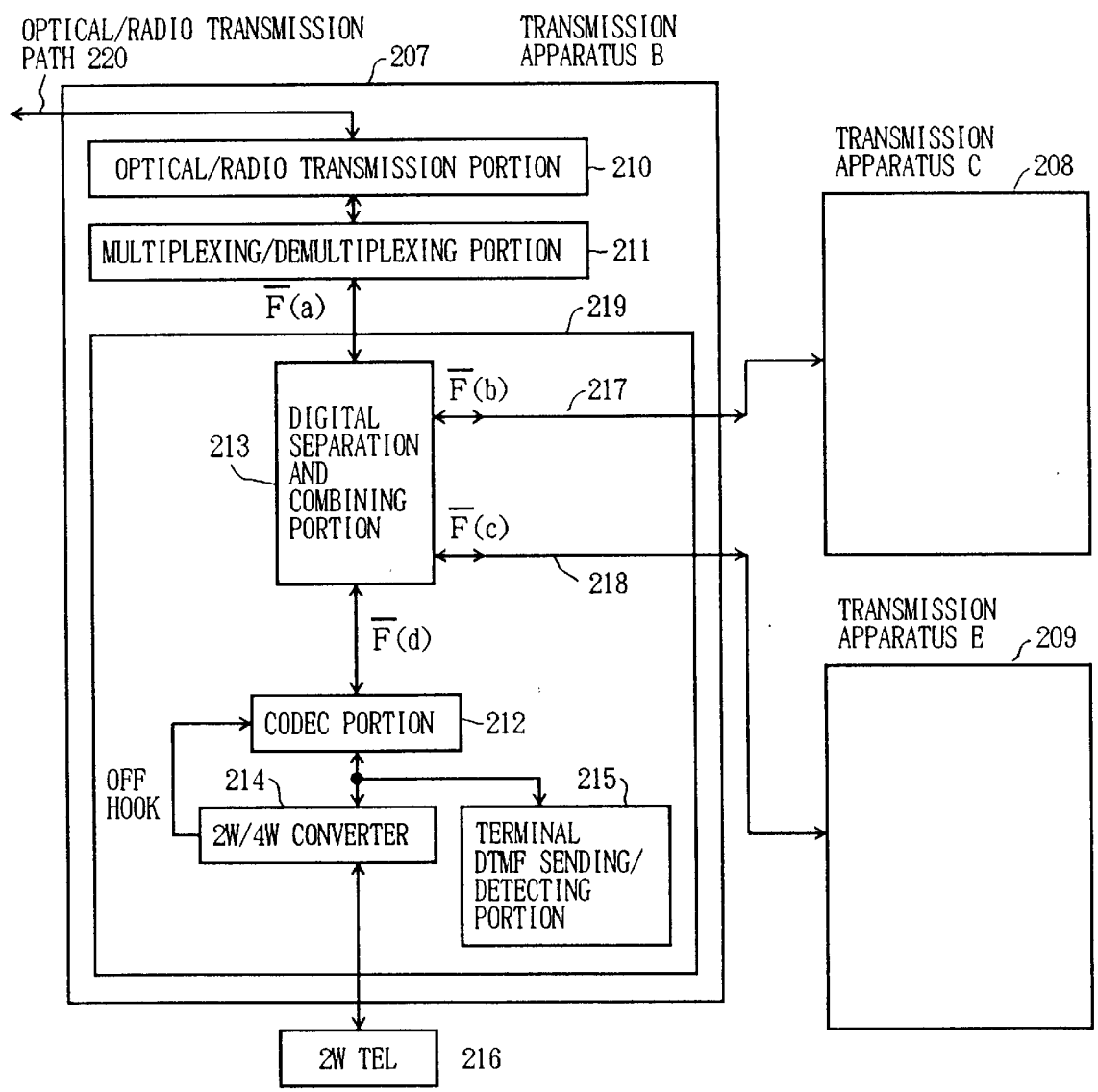
FIG. 12 shows an arrangement of a transmission apparatus in another embodiment of the present invention.

FIG. 12 shows another embodiment of the present invention. The network arrangement is the same as that shown in FIG. 3. The arrangement of the transmission apparatus shown in FIG. 12 is different from that of the arrangement shown in FIG. 2 as follows: Separation and combining of signals are performed by a digital separation and combining portion 213 in a digital state. The transmission apparatus B 207 is connected with the transmission apparatus C 208 and the transmission apparatus E 209 through the digital separation and combining portion 213. The transmission apparatus B is connected with the transmission apparatus A (not shown in FIG. 12) through the optical/radio transmission path 220.

Figure 13:
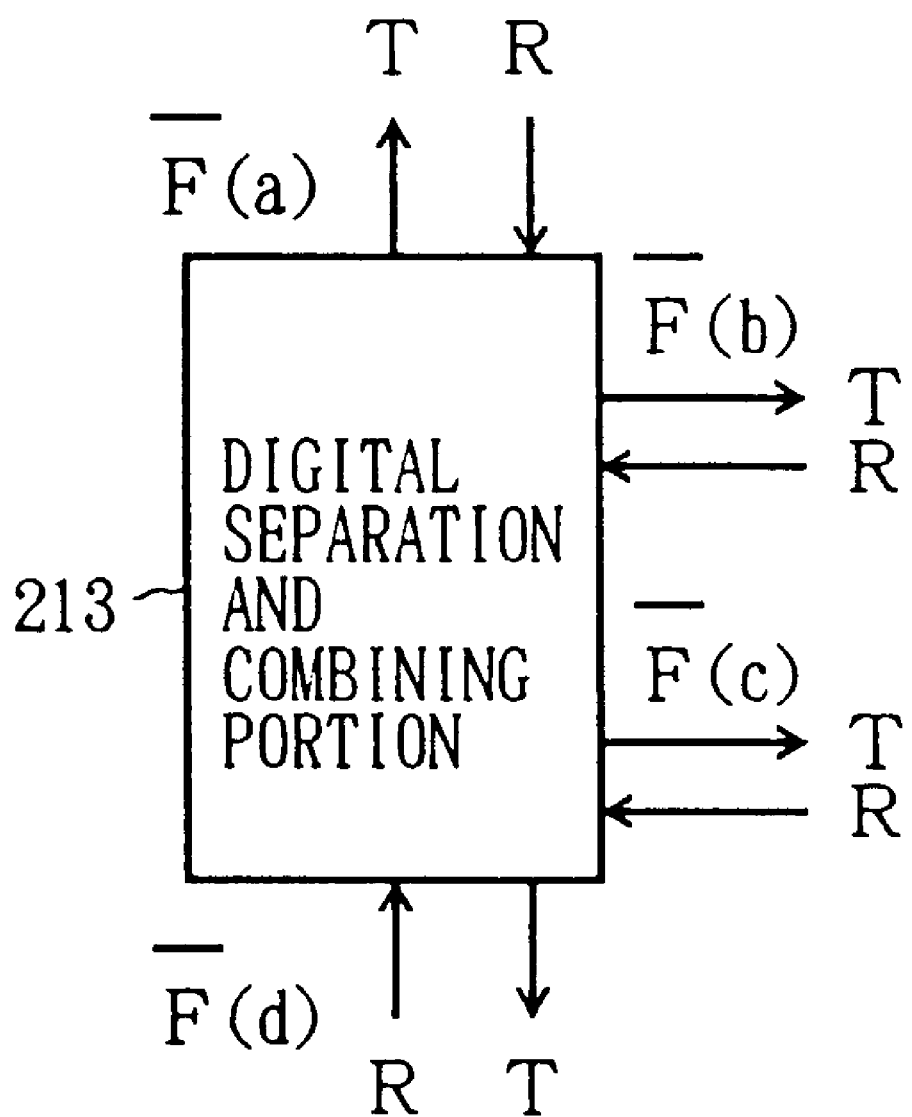
FIG. 13 illustrates a relation of input and output signals of a digital separation and combining portion.

Accordingly, because signal transmission between the transmission apparatus 80 and the transmission apparatus 83 (shown in FIG. 11) is performed by digital transmission, and the digital signal is not converted into an analog signal during the signal transmission, merely one analog-to-digital converting operation and one digital-to-analog conversion operation are needed during the signal transmission between the input to the transmission apparatus 80 and the output from the transmission apparatus 83. Thereby, error occurring due to analog-to-digital conversion can be reduced. Further, because digital coupling is used, noise generation based on analog coupling between the transmission apparatuses can be prevented. The digital separation and combining portion 213 has a function such that each port outputs a signal of the sum of signals input from all the other ports, and a signal input through each port does not return to this port. That is, when inputs and outputs of the digital separation and combining portion 213 are those shown in FIG. 13, the relationships between the inputs and outputs are as follows:

$$F(a)T=F(b)R+F(c)R+F(d)R$$

$$F(b)T=F(a)R+F(c)R+F(d)R$$

$$F(c)T=F(a)R+R(b)R+F(d)R$$

$$F(d)T=F(a)R+F(b)R+F(c)R$$

Figure 14A:
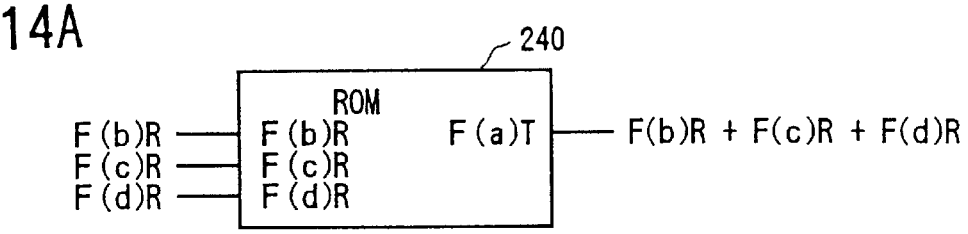
FIGS. 14A, 14B, 14C and 14D illustrate a hardware arrangement of the digital separation and combining portion.
Figure 14B:
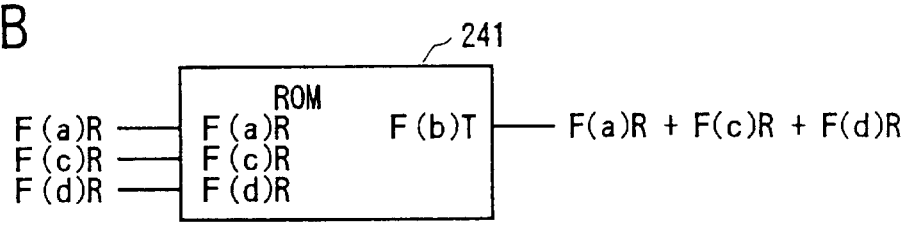
Figure 14C:
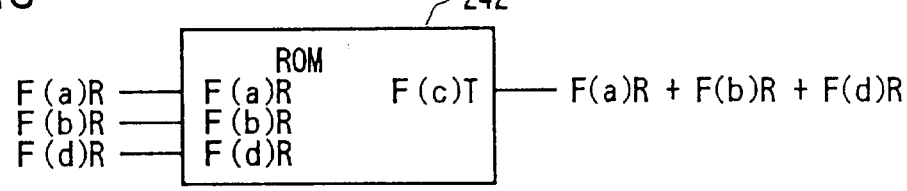
Figure 14D:
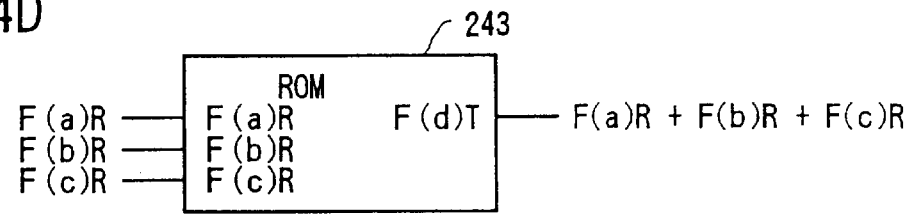

In these equations, F(a), F(b) and F(c) represent digital codes of analog signals 'a', 'b' and 'c', respectively. T, R indicate that the signals are output signals and input signals, respectively. FIGS. 14A, 14B, 14C and 14D show a hardware arrangement of the digital separation and combining portion 213 using ROMs 240 through 243. FIG. 14A shows a ROM 240 which performs a logical operation for performing calculation of F(a)T=F(b)R+F(c)R+F(d)R. In the ROM 240, the inputs F(b)R, F(c)R and F(d)R are input in an address of the ROM 240, and F(a)T is obtained from the address. Each of the other ROMs 241 through 243 performs a similar operation.

Coding by which the output digital signal at one transmission path connected to each transmission apparatus is the sum of the input digital signals at the transmission paths connected to the other transmission apparatuses, that is, a summing low holds, will now be described. The coding used here is coding by which a digital signal is univocally determined for each analog value. Coding in accordance with a $\mu$-law or coding in accordance with an A-law corresponds to the coding used here.

Figure 15:
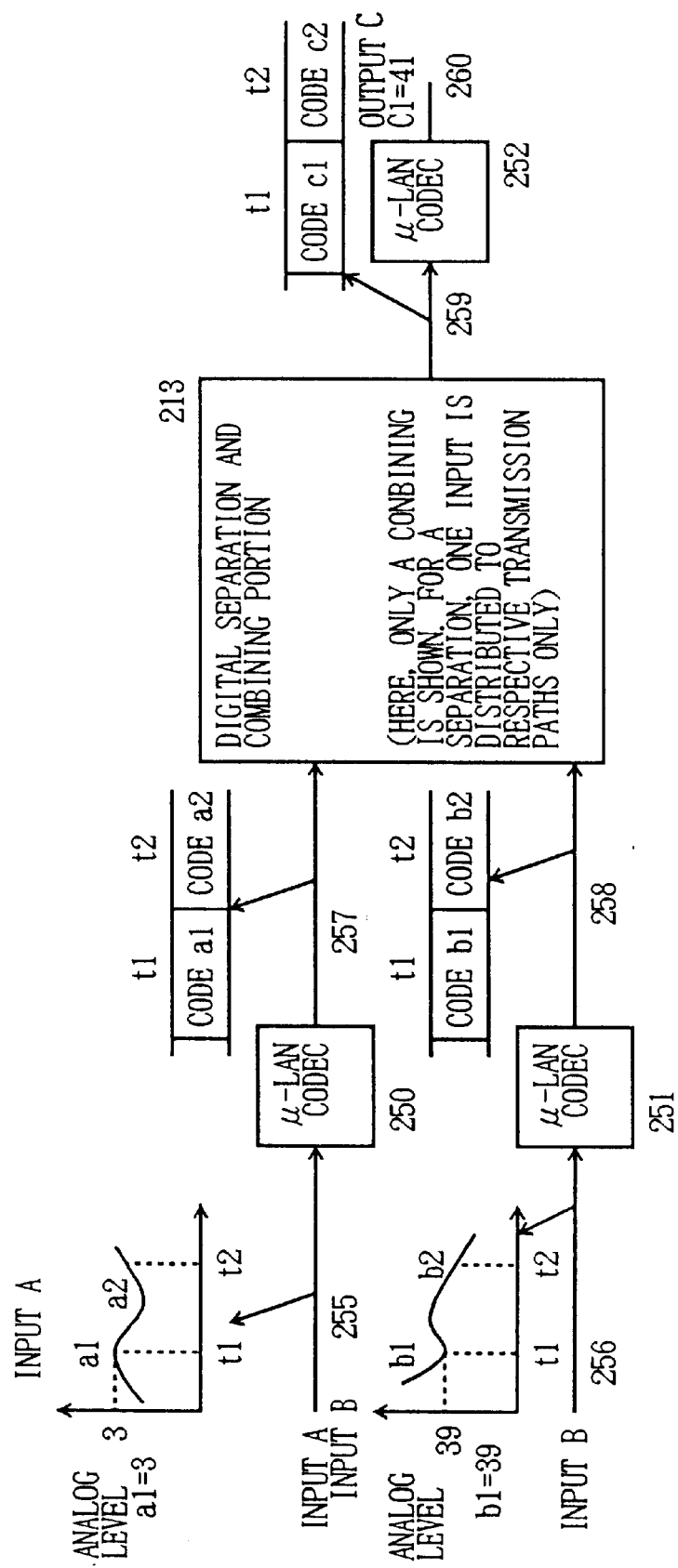
FIG. 15 illustrates combining of signals performed by the digital separation and combining portion.

With reference to FIGS. 15, 16A, 16B and 17, an example of coding in accordance with the $\mu$-law will now be described. FIG. 15 illustrates a principle in a case of three ports. Analog signals of inputs A and B at transmission paths 255 and 256 are converted into digital codes through $\mu$-law codec portions 250 and 251, respectively. The thus-obtained digital codes are combined through the digital separation and combing portion 213 in the state of the digital codes, and the thus-obtained combined digital codes are output through a transmission path 259. The combined digital codes are then decoded through a $\mu$-law codec portion 252. An analog signal obtained as a result of combining the inputs A and B is obtained as an output C. The $\mu$-law codec portion 250 quantizes the value of the input A at the time t1 and t2 and thus converts these values into digital codes a1 and a2. The $\mu$-law codec portion 251 quantizes the value of the input B at the time t1 and t2 and thus converts these values into digital codes b1 and b2. FIGS. 16A and 16B show an example of characteristics of compression of each of the $\mu$-law codec portions 250 and 251. The horizontal axis indicates an input analog signal at a time of sampling and the vertical axis indicates a value obtained as a result of the input analog signal being compressed. The input analog signal is normalized and the maximum value thereof is the input amplitude value of 8159. The characteristics of compression of the $\mu$-law codec portion are such that, as a whole, the input amplitude 8159 is compressed to the output amplitude of 128. The compression rates are different for respective regions I through VIII. Further, step sizes are different for these respective regions. A thus-compressed analog value is coded. FIG. 17 shows a specific conversion table of $\mu$-law. The regions and so forth correspond to those shown in FIGS. 16A and 16B.

For example, the analog value al (=3) of the input signal of the input A corresponds to the input amplitude range 3–5, and is compressed into the amplitude of 2. The coded output thereof is 0000010. Actually, a bit for determining polarity is added at the top thereof, and, thus, the analog value a1 of the input A becomes the code a1 (00000010). Similarly, the analog value b1 (=39) of the input B becomes the code b1 (00010001).

These coded signals are added for each sampled time. Because the sampled time of the code a1 (00000010) and the sampled time of the code b1 (00010001) are the same time t1, these codes are added to one another. The analog value obtained as a result of decoding the code a1 (00000010) is '4', and the analog value obtained as a result of decoding the code b1 (00010001) is '37'. Therefore, from the digital separation and combining portion 213, the digital sum signal c1 (00010010) of the value '41' obtained as result of adding the value '4' and the value '37' together is output.

The $\mu$-law codec portion 252 decodes the digital sum code c1 (00010010). Thus, the analog value c1 (=41) is obtained. This should be '42' as a result of adding the input analog values a1 (=3) and b1 (=39) together. However, the result '41' is obtained due to quantization error.

In the arrangement described above, codes which are obtained as a result of coding by which digital values correspond to analog values in a manner of one-to-one correspondence are used for transmitting data. However, it is also possible to transmit data using codes (hereinafter, referred to as 'AD-PCM codes') obtained as a result of AD-PCM (Adaptive Differential Pulse Code Modulation). By AD-PCM, the number of bits to be transmitted can be reduced. As a result, it is possible to improve the transmission rate.

Figure 18:
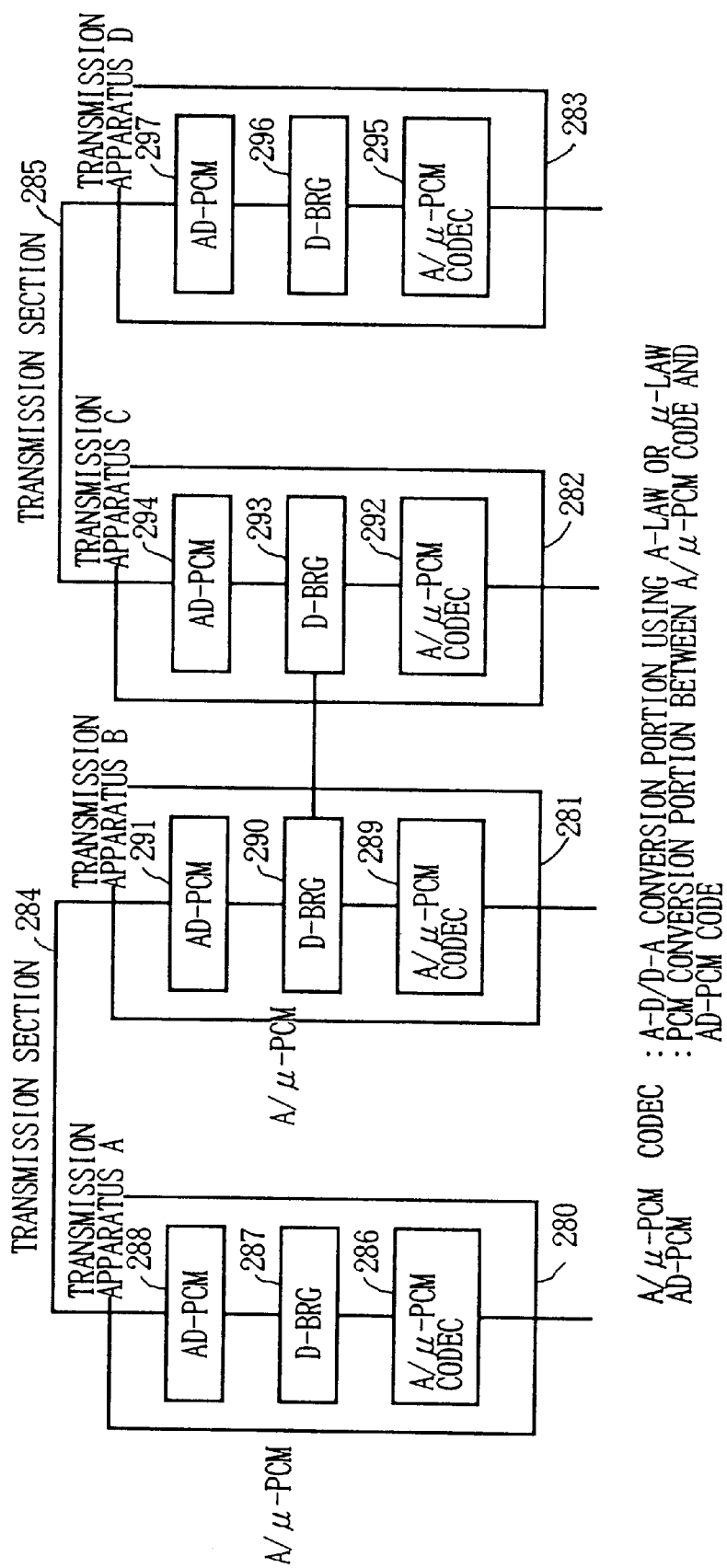
FIG. 18 illustrates a case where codes obtained as a result of AD-PCM are transmitted through a transmission path.

FIG. 18 shows an example of a case where codes obtained as a result of AD-PCM are transmitted through a transmission path. The arrangement shown in FIG. 18 is different from the above-described arrangement as follows: AD-PCM portions 288, 291, 294 and 297 are provided between the digital separation and combining portions 287, 290, 293 and 296, and transmission paths 284 and 285, respectively. Each of the AD-PCM portions 288, 291, 294 and 297 perform code conversion between codes (hereinafter, referred to as 'A/$\mu$-codec codes') obtained through a respective one of the A-law or $\mu$-law codec portions 286, 289, 292 and 295, and AD-PCM codes. Through the AD-PCM portion 288 in the transmission apparatus 280, a signal to be transmitted from the transmission apparatus A is converted into an AD-PCM code, and, then, is output to the transmission path 284. The AD-PCM code input from the transmission path 284 to the transmission apparatus 281 is converted into the A/$\mu$-codec code through the AD-PCM portion 291.

(3) Combination of (1) and (2)

Figure 19:
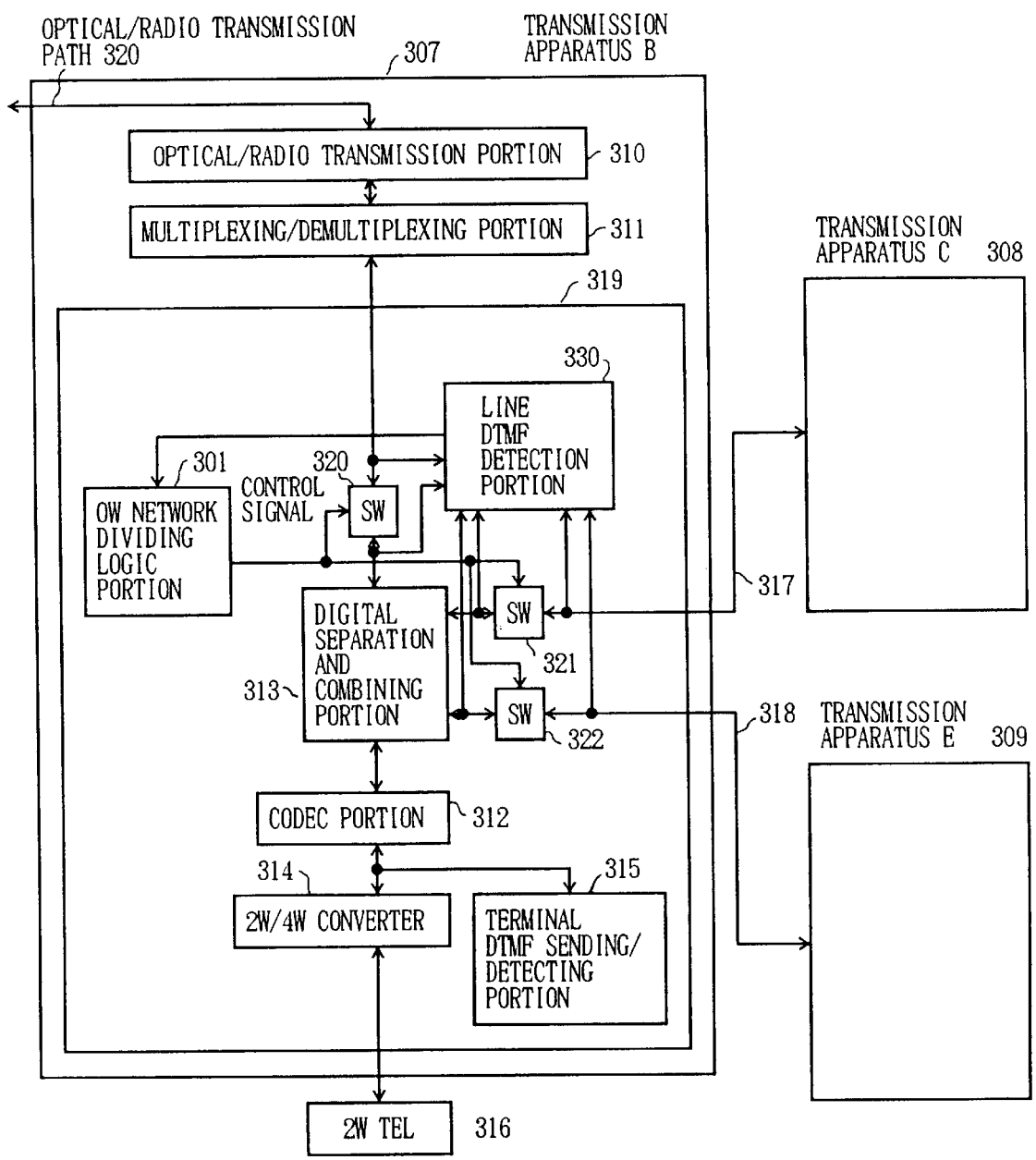
FIG. 19 shows an arrangement of a transmission apparatus in another embodiment of the present invention.

It is possible to combine the '(1) Invention Enabling a Plurality of Telephone Conversations' and '(2) Invention for Preventing Noise Generation based on Analog Coupling between Transmission Apparatuses' together. FIG. 19 shows an example of the combination.

The arrangement of FIG. 19 is obtained as a result of combining the arrangement of FIG. 5 and the arrangement of FIG. 12.

In the example shown in FIG. 19, a transmission apparatus C308 and a transmission apparatus E309 are branched off from a digital separation and combining portion 313 of a transmission apparatus B307. A digital audio signal from a transmission apparatus A is transmitted through an optical/radio transmission path 320, is input to an optical/radio transmission portion 310 (for transmitting and receiving an optical/radio signal) of the transmission apparatus B307, and, then, is demultiplexed from another signal(s) through the multiplexing/demultiplexing portion 311 (for multiplexing and demultiplexing signals), and is input to a two-wire telephone 316 via an order-wire transmission portion 319. Thereby, a voice from the transmission apparatus A can be heard in the transmission apparatus B307. An analog signal from the telephone 316 of the transmission apparatus B307 is transmitted to the transmission apparatus A through a route reverse to the above-mentioned route. That is, the audio signal output from the telephone 316 of the transmission apparatus B307 is transmitted, via the order-wire transmission portion 319, to the multiplexing/demultiplexing portion 311 which then multiplexes the audio signal with another signal(s), and, then, the thus-multiplexed signal is transmitted from the optical/radio transmission portion 310 through the optical/radio transmission path 320. Thus, the digital audio signal is transmitted to the transmission apparatus A.

The order-wire transmission portion 319 includes a codec portion 312 which performs coding and decoding, the digital separation and combining portion 313 which performs separation and combining of signals, a 2W/4W converter 314 which performs conversion between a 2-wire signal and a 4-wire signal, a terminal DTMF (Dual Tone Multi-Frequency) sending/detecting portion 315, switches 320, 321 and 322 provided to the digital separation and combining portion 313 for the transmission path to be connected with each of other transmission apparatuses, a line DTMF detection portion 330 which detects a signal at the time of signaling, and an order-wire network dividing logic portion 301.

The line DTMF detecting portion 330 detects for each line whether or not the calling signal and the call detection signal are present, and sends the result of the detection to the order-wire network dividing logic portion 301. The order-wire network dividing logic portion 301 understands the directions of flow of the calling signal and call detection signal, which flow through the transmission path connected with each of the other transmission apparatuses, as vectors, and determines whether the vectors are the reverse-direction vectors or the same-direction vectors. As a result, the order-wire network dividing logic portion 301 controls each switch so that, when the directions of flow of the calling signal and call detection signal flowing through a switch are the reverse-direction vectors, this switch is closed, and when the directions of flow of the calling signal and call detection signal flowing through a switch are the same-direction vectors, this switch is opened.

The digital separation and combining portion 313 has the function such that each port outputs the signal of the sum of the signals input from all the other ports, and a signal input through each port does not return to this port. The terminal DTMF sending/detecting portion 315 performs sending and detecting of the DTMF signal for signaling. In a case of calling, the terminal DTMF sending/detecting portion 315 sends the calling signal. In a case where the calling signal is received by this transmission apparatus, the terminal DTMF sending/detecting portion 315 sends the call detection signal to the terminal (transmission apparatus) which has sent the calling signal. The terminal DTMF sending/detecting portion 315 is provided inside the order-wire transmission portion 319. However, it is also possible that the terminal DTMF sending/detecting portion 315 is provided outside the order-wire transmission portion 319.

The digital separation and combining portion 313 performs separation and combining of the signals in the digital state. The transmission apparatus B307 is connected with the transmission apparatus C308 and the transmission apparatus E309 through the digital separation and combining portion 313.

By using this transmission system, it is possible to eliminate crosstalk and prevent noise generation due to analog coupling along the path of transmission.

Further, the present invention is not limited to the above-described embodiments, and variations and modifications may be made without departing from the scope of the present invention.

The contents of the basic Japanese Patent Application No.10-066900, filed on Mar. 17, 1998, are hereby incorporated by reference.

What is claimed is:

1. A transmission system comprising a plurality of transmission apparatuses which use a single channel commonly,
   each transmission apparatus comprising switches for connecting and disconnecting transmission paths with other transmission apparatuses, a line signaling-signal monitoring and detecting portion, and a network dividing logic portion which opens and closes said switches based on an output of said line signaling-signal monitoring and detecting portion,
   wherein said network dividing logic portion closes switches for the transmission paths between transmission apparatuses which perform a telephone conversation and opens the other switches.

2. The transmission system as claimed in claim 1, wherein:
   said line signaling-signal monitoring and detecting portion monitors and detects, for each line, a calling signal and a call detection signal which responds to the calling signal;
   said network dividing logic portion determines, for each switch, whether the directions of the calling signal and the call detection signal flowing through said switch are the same or different, and closes said switch when the directions of the calling signal and the call detection signal flowing through said switch are different, and opens said switch when the directions of the calling signal and the call detection signal flowing through said switch are the same.

3. A transmission apparatus which uses a single channel commonly together with other transmission apparatuses, said transmission apparatus comprising:
   switches for connecting and disconnecting transmission paths connected with other transmission apparatuses;
   a line signaling-signal monitoring and detecting portion which monitors and detects, for each line, a signaling signal transmitted between said transmission apparatus and another transmission apparatus; and
   a network dividing logic portion which opens and closes said switches based on an output of said line signaling-signal monitoring and detecting portion,
   wherein said network dividing logic portion closes switches for transmission paths between transmission apparatuses which perform a telephone conversation and opens the other switches.

4. The transmission apparatus as claimed in claim 3, wherein:
   said line signaling-signal monitoring and detecting portion monitors and detects, for each line, a calling signal and a call detection signal which responds to the calling signal;
   said network dividing logic portion determines, for each switch, whether the directions of the calling signal and the call detection signal flowing through said switch are the same or different, and closes said switch when the directions of the calling signal and the call detection signal flowing through said switch are different, and opens said switch when the directions of the calling signal and the call detection signal flowing through said switch are the same.

5. The transmission apparatus as claimed in claim 3, wherein, when at least one switch has been closed, said network dividing logic portion does not open the closed switch.

6. The transmission apparatus as claimed in claim 3, wherein said network dividing logic portion closes all or some opened switches as a result of receiving a forcible releasing signal from another transmission apparatus.

7. The transmission apparatus as claimed in claim 3, wherein said network dividing logic portion opens a switch for a connection between networks ordinarily, and closes said switch when receiving an inter-network accessing signal.

* * * * *